July 17, 1956 W. A. BEDFORD, JR 2,754,561

MOLDING FASTENER

Filed May 5, 1950

INVENTOR:
WILLIAM A. BEDFORD JR.,

BY *Philip E. Parker*

ATTORNEY.

United States Patent Office 2,754,561
Patented July 17, 1956

2,754,561

MOLDING FASTENER

William A. Bedford, Jr., North Scituate, Mass., assignor, by mesne assignments, to United-Carr Fastener Corporation, Boston, Mass., a corporation of Delaware Application May 5, 1950, Serial No. 160,334

1 Claim. (Cl. 24—213)

The present invention relates to fasteners and more particularly to fasteners of the snap fastening type designed to secure a plastic molding or the like to an apertured support, and the invention aims generally to improve existing fasteners for that purpose.

A primary object of the invention is the provision of an improved fastener having a part-holding base adapted for frictional engagement with a channelled grooved part to be supported, for example a plastic molding refrigerator breaker frame or the like, and also a support-engaging stud adapted for snap fastener locking engagement with an apertured support.

A further object of the invention is the provision of a fastener of the type described wherein the part-holding base is provided with prongs or teeth adapted to bite into the walls of a part to be supported when the fastener is assembled with an apertured support.

A still further object of the invention is the provision of an improved fastener adapted to have snap fastener locking engagement with a support.

Another object of the invention is the provision of a simple one-piece sheet metal fastener for the purposes above set forth.

The above and other objects of the invention will be apparent to persons skilled in the art to which the invention relates from a consideration of the accompanying drawings and annexed specification illustrating and describing a preferred embodiment of the invention.

Figure 1:
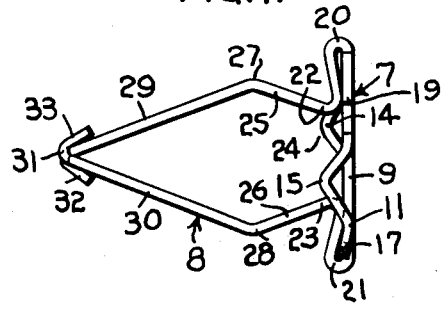
Fig. 1 is a side elevation of a fastener embodying the invention.

Referring to the drawings, the fastener is designed primarily for securing a part 1 having a groove or channel 2, undercut as at 3, to a support 5 having an aperture 6. The support 5 may be of any type or construction, such as a refrigerator wall, housing or receptacle, and the channelled part 1 to be supported thereon may be a plastic molding, refrigerator breaker frame or the like.

The fastener of the present invention is advantageously formed of a single strip of resilient sheet material, for example sheet metal, suitably shaped to provide a part-engaging base 7 and an elongated loop-shaped support-engaging stud or part 8.

The base 7 of the fastener is preferably formed by suitably stamping, cutting or otherwise shaping the intermediate portion of the strip to form an elongated central body portion 9 and laterally disposed substantially parallel leg portions 10 and 11. The leg portions 10 and 11 are integrally connected to the opposite side edges of the body portion 9 at opposite ends thereof by the connecting portions 12 and 13 and thus extend in opposite directions in spaced relation to the side edges of the body portion. The width of the base 7 measured between the outer edges of the leg portions 10 and 11 should be somewhat less than the width of the undercuts 3 of the channel 2 and somewhat greater than the width of the groove between the undercuts.

Figure 2:
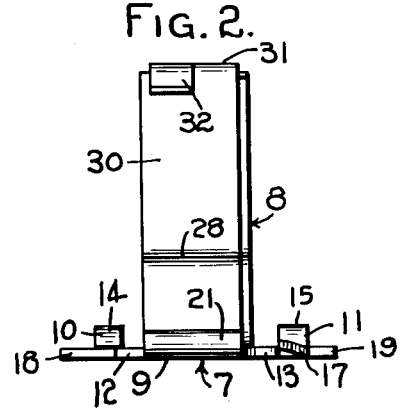
Fig. 2 is an edge elevation thereof.
Figure 3:
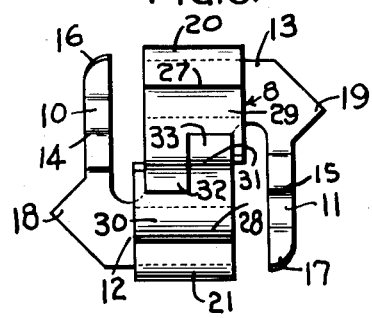
Fig. 3 is a plan view of the fastener shown in Figs. 1 and 2.

The leg portions 10 and 11 are preferably bowed intermediate the ends thereof as shown at 14 and 15 of Fig. 2, so that they will frictionally engage the upper and lower adjacent surfaces of the undercuts 3 to hold the fastener in position on the part 1 prior to assembly with a support. The free end portions of the legs 10 and 11 may be suitably rounded, as at 16 and 17, to facilitate assembling the fastener with the part 1.

Figure 5:
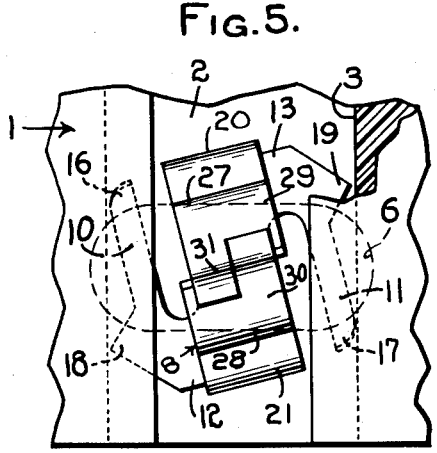
Fig. 5 is a plan view of the fastener assembly of Fig. 4 and viewed from the right thereof, omitting the support but showing in dotted lines the support aperture and the relative position of the fastener therein.
Figure 6:
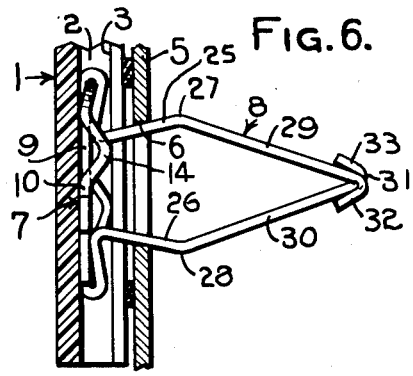
Fig. 6 is a side view of the completely assembled fastener installation in accordance with the invention, the support and part to be supported being shown in cross-section.

Opposite the connecting portions 12 and 13 and intermediate the ends thereof the leg portions 10 and 11 are provided with laterally extending pointed part-engaging prongs or teeth 18 and 19. The width of the base measured transversely between parallel planes passing through the points of the prongs is somewhat greater than the width of the undercuts 3 so that when the fastener is positioned on the part 1, as shown in Fig. 5, and then rotated, the pointed prongs will bite or dig into the sides thereof.

In forming the support-engaging part or stud 8, the end portions of the strip at opposite ends of the body portion 9 are reversely bent upon themselves to form flat U-shaped portions 20 and 21 for added strength and rigidity, and are then curved outwardly, as at 22 and 23, to form a neck portion 24 and diverging arm portions 25 and 26. The arm portions 25 and 26 diverge to a plane of maximum thickness 27, 28 beyond which they converge, as at 29 and 30, toward a rounded nose portion 31. The rounded nose portion 31 is preferably formed by rabbetting the ends of the strip on opposite side edges and then folding or curving the projecting tongues or tabs 32 and 33 so formed over the ends of the strip in overlapping relation.

The fastener may be readily assembled with a part to be supported by inserting the base 7 into the end of an undercut groove therein and then sliding it along the groove to a desired position. Since the width of the base measured between parallel planes passing through the points of the prongs or teeth 18 and 19 is somewhat greater than the width of the undercut groove, the fastener must be rotated slightly in a counterclockwise direction, as viewed in Fig. 5, to permit insertion into and sliding along the groove. Entry of the base 7 into the groove and sliding therealong is facilitated by the rounded free end portions 16 and 17 of the legs 10 and 11 and the spacing thereof.

The base 7 is retained in a desired position in the groove of the part to be supported by virtue of the tensioned engagement of the bowed leg portions 10 and 11 with the upper and lower adjacent surfaces of the undercut. Thus the frictional drag created maintains the fastener in any desired position pending assembly with an apertured support.

The assembled fastener and part may now be assembled with a support by snapping the support-engaging stud 8 into a suitably shaped aperture therein. In accordance with the invention the shape and disposition of the aperture is such that when the fastener is snapped thereinto a twisting or turning motion is imparted to the base, thus causing the prongs or teeth 18 and 19 to dig into the confining edges of the undercut groove.

Figure 4:
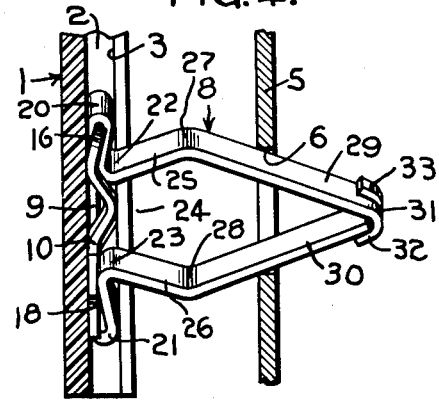
Fig. 4 is a side view of the fastener mounted on a grooved part with the support-engaging stud thereof in engagement with an apertured support prior to being snapped therein, the grooved part and support being shown in section.

An oval or rectangular slot or opening having the long axis thereof substantially perpendicular to the longitudinal axis of the undercut groove may advantageously be used although other similarly shaped openings designed to accomplish the same purpose will be satisfactory. With this arrangement, when the fastener stud 8 is forced into the opening 6, the opposite edges of the opening contact the opposite diagonal corners of the stud, as clearly shown in Figs. 4 and 5, and thereby exert sufficient pressure thereon to cause the fastener to rotate in a clockwise direction and force the prongs or teeth 18 and 19 to dig into the plastic molding or like part to be supported.

The invention thus provides a simple, economical and effective fastener which may be quickly and easily applied and which, during application thereof, is caused to bitingly engage a part to be supported to securely and tightly attach it to a support.

While I have illustrated and described a preferred embodiment of the invention, I do not intend to be limited thereto as the scope of the invention is best defined in the appended claim.

I claim:

A fastener member comprising: a substantially flat base portion provided with a surface on one face for engaging the base of an undercut groove in a part to be supported, a pair of resilient legs on opposite side edges of said base portion having curved portions for engagement with undercut faces of such a groove in opposition to the base of said groove, and a pair of pointed teeth disposed on said opposite side edges at diagonally opposite corners of said base portion and extending laterally beyond said legs; and a stud portion extending from said base portion and having opposed resilient flat surfaces diverging from said base portion and then converging toward the free end thereof for engagement with the opposed edges of an aperture in a support, said converging and diverging surfaces providing camming surfaces for camming engagement with the opposed edges of such an aperture for orienting said fastener member with respect to such support and to the groove in the part to be supported, whereby said pointed teeth may be caused to bitingly engage the opposed confining walls of the groove in the part to be supported upon installation of said stud in the aperture of a support thereby securing said fastener member within the groove of said part to be supported.

References Cited in the file of this patent

UNITED STATES PATENTS

| | | |
|---|---|---|
| 1,813,053 | Hosking | July 7, 1931 |
| 2,084,717 | Wiley | June 22, 1937 |
| 2,165,412 | Place | July 11, 1939 |
| 2,221,124 | Wiley | Nov. 12, 1940 |
| 2,226,491 | Gustafson | Dec. 24, 1940 |
| 2,275,127 | Brown | Mar. 3, 1942 |
| 2,531,352 | Churchill | Nov. 21, 1950 |